United States Patent
Yang et al.

(10) Patent No.: US 10,838,143 B2
(45) Date of Patent: Nov. 17, 2020

(54) RARE EARTH-DOPED DOUBLE-CLAD OPTICAL FIBER AND PREPARATION METHOD THEREOF

(71) Applicant: YANGTZE OPTICAL FIBRE AND CABLE JOINT STOCK LIMITED COMPANY, Hubei (CN)

(72) Inventors: Yucheng Yang, Hubei (CN); Beibei Cao, Hubei (CN); Xinben Zhang, Hubei (CN); Hongqi Huang, Hubei (CN); Peng Wang, Hubei (CN); Tianyong Yue, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 8 days.

(21) Appl. No.: 16/334,831

(22) PCT Filed: Sep. 17, 2017

(86) PCT No.: PCT/CN2017/101992
§ 371 (c)(1),
(2) Date: Mar. 20, 2019

(87) PCT Pub. No.: WO2018/068609
PCT Pub. Date: Apr. 19, 2018

(65) Prior Publication Data
US 2020/0018897 A1    Jan. 16, 2020

(30) Foreign Application Priority Data

Oct. 12, 2016  (CN) .......................... 2016 1 0895210

(51) Int. Cl.
*G02B 6/036* (2006.01)
*C03B 37/025* (2006.01)
(Continued)

(52) U.S. Cl.
CPC ........ *G02B 6/03694* (2013.01); *C03B 37/025* (2013.01); *G02B 6/02371* (2013.01); *H01S 3/06708* (2013.01); *G02B 2006/1208* (2013.01)

(58) Field of Classification Search
CPC .............................................. G02B 2006/1208
See application file for complete search history.

(56) References Cited

U.S. PATENT DOCUMENTS 6,157,763 A    12/2000 Grubb et al.
6,477,307 B1 * 11/2002 Tankala ............ C03B 37/01211
385/127
(Continued)

FOREIGN PATENT DOCUMENTS

CN    102132178 A    7/2011
CN    102992613 A    3/2013
(Continued)

OTHER PUBLICATIONS

State Intellectual Property Office of People's Republic of China, "International Search Report for PCT Application No. PCT/CN2017/101992", China, dated Dec. 20, 2017.

*Primary Examiner* — Rhonda S Peace
(74) *Attorney, Agent, or Firm* — Tim Tingkang Xia, Esq.; Locke Lord LLP

(57) ABSTRACT

A rare earth-doped double-clad optical fiber includes a rare earth ion-doped fiber core, an inner cladding layer, and an outer cladding layer. A cross section of the inner cladding layer is a non-circular plane including at least two arcuate notches. According to the provided optical fiber, optical processing can be performed on a preform without changing a preform preparation process and a drawing process. The inner cladding is designed to have a non-circular planar structure having a cross section with at least two arcuate notches. While maintaining the same light absorption efficiency of pump light within the cladding layer, a preform (Continued)

polishing process is simplified, a risk of cracking the preform during polishing of multiple surfaces and a risk of contamination of the preform caused by impurities are reduced, wire drawing control precision is better, and comprehensive performance of the optical fiber is improved.

7 Claims, 4 Drawing Sheets

(51) Int. Cl.
    *G02B 6/02*     (2006.01)
    *H01S 3/067*    (2006.01)
    *G02B 6/12*     (2006.01)

(56) References Cited

U.S. PATENT DOCUMENTS

| | | | | |
|---|---|---|---|---|
| 6,516,124 B2* | 2/2003 | Po | ............. | G02B 6/03622 385/126 |
| 6,831,934 B2* | 12/2004 | Wang | ............. | G02B 6/4204 372/6 |
| 6,959,022 B2* | 10/2005 | Sandrock | ............. | C03B 37/01426 372/6 |
| 7,003,206 B2* | 2/2006 | Tankala | ............. | C03B 37/01211 385/127 |
| 7,050,686 B2* | 5/2006 | Farroni | ............. | G02B 6/024 382/124 |
| 7,062,137 B2* | 6/2006 | Farroni | ............. | G02B 6/024 385/123 |
| 7,313,312 B2* | 12/2007 | Kimball | ............. | C03B 37/01413 385/123 |
| 7,421,175 B2* | 9/2008 | Varnham | ............. | H01S 3/06708 372/6 |
| 2002/0122645 A1 | 9/2002 | Po | | |
| 2004/0156606 A1 | 8/2004 | Po | | |
| 2010/0021118 A1* | 1/2010 | Chen | ............. | G02B 6/02342 385/128 |
| 2019/0319422 A1* | 10/2019 | Kitahara | ............. | H01S 3/10 |
| 2020/0018897 A1* | 1/2020 | Yang | ............. | C03B 37/01237 |

FOREIGN PATENT DOCUMENTS

| | | |
|---|---|---|
| CN | 106405728 A | 2/2017 |
| CN | 205982710 U | 2/2017 |

* cited by examiner

RARE EARTH-DOPED DOUBLE-CLAD OPTICAL FIBER AND PREPARATION METHOD THEREOF

CROSS-REFERENCE TO RELATED APPLICATIONS

This application is a U.S. national stage application of PCT Patent Application Serial No. PCT/CN2017/101992, filed Sep. 17, 2017, which itself claims priority to Chinese Patent Application No. 201610895210.0, filed Oct. 12, 2016 in the State Intellectual Property Office of P.R. China, which are hereby incorporated herein in their entireties by reference.

FIELD OF THE INVENTION

The present disclosure relates to the technical field of optical fiber preparation, and in particular, to a rare earth-doped double-clad optical fiber and a preparation method thereof.

BACKGROUND OF THE INVENTION

A fiber laser is a kind of solid-state laser, and it uses rare earth-doped optical fibers as laser oscillating or amplifying gain mediums. By doping of different rare earth elements, light of different wavelengths can be radiated under excitation of corresponding wavelengths, and can cover a large spectrum range. By doping rare earth elements such as Yb, Er, Nd, Ho, and Tm into a fiber core of an optical fiber, gain laser output of different wavelengths can be obtained. Compared with traditional solid-state lasers, fiber lasers have higher heat dissipation performance, higher conversion efficiency, optical systems simpler and easier to maintain, and better output beam quality. As one of the hot technologies in the field of laser technology in recent years, fiber lasers have developed the most and are the most concerned, and the market share thereof is getting higher and higher.

Rare earth-doped optical fibers used in early fiber lasers adopted a single-clad design. For single mode fiber lasers, pump light injected into a fiber core was required to be single mode. This condition greatly limits the injection efficiency and power of the pump light, and thus it is difficult to improve an output power of fiber lasers. When Sintzer proposed the concept of cladding pumps and double-clad optical fibers, the pattern of fiber lasers was completely changed, and the development of the fiber laser technology was greatly promoted. As a fiber laser power increases, application of fiber lasers is more and more extensive in fields of material processing, medicine, scientific research, and military affairs.

In design of double-clad optical fibers, an outer coating with a low refractive index (or a fluorine-doped glass layer) is used to restrict transmission of pump light within an inner cladding layer, so that an area of the inner cladding layer is increased, and an injection power of the pump light is obviously improved. However, design of the circular inner cladding layer can significantly reduce absorption and utilization efficiency of the pump light, because plenty of helical light is formed in the fully symmetrical inner cladding layer. The helical light cannot penetrate the doped fiber core and cannot be absorbed and converted by rare earth ions. In order to improve absorption efficiency of a cladding layer, to destroy the helical light in the cladding layer is an effective method. In current commercial double-clad rare earth-doped optical fibers, such as Tm, Yb, Ho, or Er-doped double-clad optical fibers or double-doped (e.g., Yb/Er) double-clad optical fibers, the inner cladding layer generally does not have a highly symmetrical circular shape, and special-shaped asymmetric inner cladding layers are commonly used. For example, octagonal inner cladding layers are the most commonly used; plum-shaped octagonal inner cladding layers are also used; D-type cladding layers (as a diagram of a cross section of a D-type inner cladding layer of a conventional optical fiber shown in FIG. 7) are less adopted; and hexagonal cladding layers and rectangular cladding layers are sparingly used in researches only. By using a non-circular inner cladding layer, utilization efficiency of pumping light by an optical fiber can be greatly improved, a length of the optical fiber can be decreased, a nonlinear effect can be reduced, manufacturing costs of an optical fiber laser can be reduced, and comprehensive performance of the optical fiber laser can be improved.

An octagonal inner cladding structure is often used in existing commercial double-clad optical fibers, while a plum-shaped inner cladding structure is used in the minority. The two inner cladding layer structures can obviously optimize pumping efficiency of double-clad optical fibers, but there are some disadvantages. For example, double-clad optical fibers with a plum-shaped inner cladding layer has high pumping efficiency, but the technical requirement of optical polishing for quartz preforms is relatively high, and it is difficult to control a concave shape and polishing precision. The octagonal inner cladding layer has less processing difficulty, but eight surfaces need to be polished separately, and it is necessary to ensure that no eccentricity occurs during polishing. In addition, optical processing and polishing is performed several times on eight surfaces, which takes a long time. Due to certain stress of the preforms, probability of cracking during polishing is also high. Moreover, particles such as diamond or grinding powder need to be used in polishing, which may cause uncleanness of the surfaces, thereby resulting in increased loss after drawing the optical fibers. An octagon or a plum shape has sharp edges and corners, the processing is difficult, and strength of optical fibers after drawing is adversely affected.

SUMMARY OF THE INVENTION

With respect to defects of the prior arts, the present disclosure provides a rare earth-doped double-clad optical fiber and a preparation method thereof. The optical fiber is of a non-circular special-shaped inner cladding layer design, which can simplify an optical processing and a polishing process of a preform, reduce polishing time, decrease surfaces to be polished, and improve optical fiber strength while maintaining an original preparation process of the preform.

In order to achieve the above purposes, the present disclosure provides a rare earth-doped double-clad optical fiber, comprising a rare earth ion-doped fiber core, an inner cladding layer, and an outer cladding layer. A cross section of the inner cladding layer is a non-circular plane comprising at least two arcuate notches, and the at least two arcuate notches are not connected with one another.

In one embodiment of the present disclosure, a relationship between a refractive index $n_1$ of the fiber core and a refractive index $n_2$ of the inner cladding layer is represented as $(n_1^2 - n_2^2)^{1/2}$, which is in a range from 0.01 to 0.25.

In one embodiment of the present disclosure, a relationship between the refractive index $n_2$ of the inner cladding layer and a refractive index $n_3$ of the outer cladding layer is represented as $(n_2^2-n_3^2)^{1/2}$, which is in a range from 0.2 to 0.5.

In one embodiment of the present disclosure, rare earth ions doped in the fiber core comprise one or two of Tm, Yb, Ho, and Er.

In one embodiment of the present disclosure, the inner cladding layer is a silica matrix with a refractive index of 1.4573 and a measurement wavelength of 632 nm.

In one embodiment of the present disclosure, the cross section of the inner cladding layer is a non-circular plane comprising four identical arcuate notches.

In one embodiment of the present disclosure, the four identical arcuate notches are symmetrically distributed on the non-circular plane.

In one embodiment of the present disclosure, a ratio between a height of the arcuate notches and a circle diameter of the inner cladding layer is in a range from 0.01 to 0.05.

According to a further aspect of the present disclosure, a preparation method of a rare earth-doped double-clad optical fiber is further provided, the method comprising following steps: a circular quartz preform doped with rare earth elements is prepared by vapor deposition or a solution method or a sol-gel method; a diameter of the circular quartz preform is adjusted to meet a predetermined ratio between a diameter of a fiber core and a diameter of an inner cladding layer; optical processing and polishing is performed on a side surface of the circular quartz preform to obtain a non-circular quartz preform having a cross section with at least two arcuate notches; and the quartz preform is drawn and coated with a coating outside the glass to form an outer cladding layer, so as to obtain the rare earth-doped double-clad optical fiber.

In one embodiment of the present disclosure, the cross section of the quartz preform is a non-circular plane comprising four identical and symmetrically distributed arcuate notches, and a ratio between a height of the arcuate notches and a circle diameter of the inner cladding layer is in a range from 0.01 to 0.05.

Compared with the prior arts, the present disclosure has following beneficial effects.

(1) For a conventional D-type optical fiber, a relatively large portion needs to be polished on the basis of a circular optical fiber, while for the double-clad optical fiber provided by the present disclosure, only a small portion needs to be polished in the circular optical fiber. The double-clad optical fiber of the present disclosure has the same function of destroying helical light as the D-type optical fiber, and has absorption and utilization efficiency of pump light in the cladding layer close to and at a same level with the D-type optical fiber.

(2) For a conventional regular octagonal optical fiber, a polishing process needs to be performed on side surfaces of a circular optical fiber preform to form eight surfaces, so that a cross section of the preform has a regular octagonal shape. To perform a polishing process on eight surfaces, time spent on polishing is increased, a risk of contamination of the optical fiber is increased, and a risk of cracking of the preform caused by stress during polishing is increased. Meanwhile, to maintain a same tolerance for eight surfaces and to maintain a doped region not to be eccentric, requirements on grinding jigs and rotation angles are high. However, for the double-clad optical fiber of the present disclosure, the polishing process is merely performed on two surfaces perpendicular to each other to form multiple planes. Times for polishing are less, and time spent on polishing is shorter. Thus, manufacturing efficiency of the preform can be improved, and the risk of cracking and contamination of the preform due to polishing can be reduced. Besides, the double-clad optical fiber of the present disclosure has the same function of damaging helical light as the regular octagonal optical fiber, and has the utilization efficiency of pump light in the cladding layer close to and at the same level with the regular octagonal optical fiber. Outer edges of the optical fiber of the present disclosure are not as sharp as those of the regular octagonal optical fiber. In a drawing process, a test result of a wire diameter measuring instrument is more accurate, a fluctuation is smaller, precision is better controlled, and a drawing stability is higher than that of the regular octagonal optical fiber.

(3) For a traditional plum-shaped cladding layer, irregular surfaces need to be polished on the basis of a circular optical fiber preform. Requirements for optical processing are too high, and precision control is difficult. However, for the double-clad optical fiber of the present disclosure, the polishing process is merely performed on the side surfaces of the preform to form two to eight discrete planes. Times for polishing are less, and time spent on polishing is shorter. Thus, manufacturing efficiency of the preform can be improved; the risk of cracking and contamination of the preform due to polishing can be reduced; process control is simple; and costs are low. In addition, the double-clad optical fiber of the present disclosure has the utilization efficiency of pump light in the cladding layer equivalent to that of the regular octagonal optical fiber.

(4) Compared with the existing commercial double-clad optical fibers, the double-clad optical fiber of the present disclosure is optimized in reliability and optical performance, has obvious advantages in manufacturing yield, simplifies the optical fiber preparation process, and is suitable for large-scale production.

(5) For the 4D type double-clad optical fiber provided by embodiments of the present disclosure, it is only necessary to polish four planes on two surfaces perpendicular to each other, and the optical fiber has symmetry.

BRIEF DESCRIPTION OF THE DRAWINGS

Yb-doped double-clad optical fiber having arcuate notches of different heights in an embodiment of the present disclosure.

DETAILED DESCRIPTION OF THE EMBODIMENTS

To illustrate the purposes, the technical solutions, and advantages of the present disclosure more clearly, the present disclosure will be further described in detail below with reference to the accompanying drawings and embodiments. It should be understood that the specific embodiments described herein are merely used for explaining the present disclosure, rather than restricting the present disclosure. Further, the technical features involved in the various embodiments of the present disclosure described below may be combined with one another as long as they do not constitute a conflict with one another.

To facilitate introduction of the technical solution of the present disclosure, the related terms in the present disclosure are first defined and explained as follows.

Core Layer: a portion having a relatively high refractive index in the middle of an optical fiber; having a circular shape; being a light guide layer of signal light in the optical fiber; and having a refractive index of $n_1$.

Inner Cladding Layer: a portion next to a fiber core; having a refractive index of $n_2$; generally being a quartz matrix; having a refractive index of 1.4573.

Outer Cladding Layer: a portion having a low refractive index next to an inner cladding layer in an optical fiber; being a coating of a low refractive index or a fluorine-doped coating; having a refractive index of $n_3$.

$a_1$: a diameter of a core layer; a unit thereof being μm.

$a_2$: a distance between two parallel planes when a 4D-type inner cladding layer is taken as an example in an embodiment of the present disclosure; a unit thereof being μm.

$a_3$: a circle diameter of an inner cladding layer; a unit thereof being μm.

Figure 1:
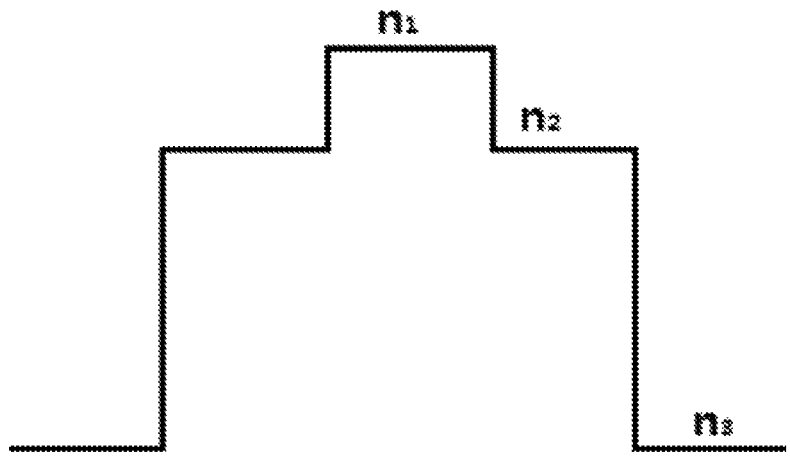
FIG. 1 schematically shows a refractive index profile of a double-clad optical fiber in an embodiment of the present disclosure.

FIG. 1 schematically shows a refractive index profile of a double-clad optical fiber in an embodiment of the present disclosure. As shown in FIG. 1, a refractive index relationship among a core layer, an inner cladding layer, and an outer cladding layer is $n_1 > n_2 > n_3$.

Figure 2:
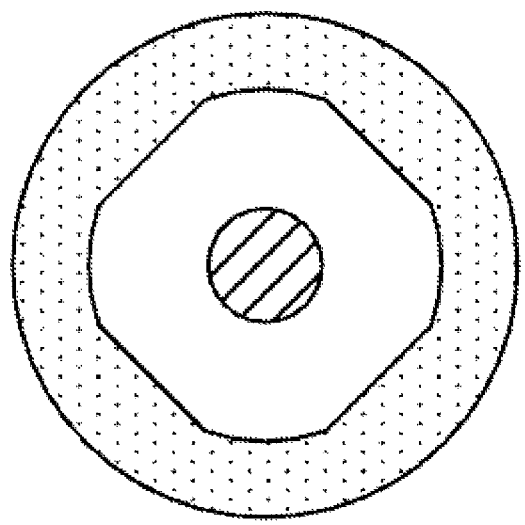
FIG. 2 schematically shows a cross section of a 4D inner cladding layer in an embodiment of the present disclosure (a central circular part is a rare earth-doped fiber core, a2/a3=0.924, and a corresponding ratio between a height of an arcuate notch and a circle diameter of the inner cladding layer is 0.038)

As shown in FIG. 2, the present disclosure provides a rare earth-doped double-clad optical fiber, comprising a rare earth ion-doped fiber core, an inner cladding layer, and an outer cladding layer. A cross section of the inner cladding layer is a non-circular plane comprising at least two arcuate notches, and the at least two arcuate notches are not connected with one another.

The fiber core has a refractive index of $n_1$. The inner cladding layer has a refractive index of $n_2$, and is usually a quartz matrix with a refractive index of 1.4573 and a measurement wavelength of 632 nm. $(n_1^2 - n_2^2)^{1/2}$ is in a range from 0.01 to 0.25. The fiber core is doped with rare earth ions, including Tm, Yb, Ho, and Er, or is double-doped with Yb/Er.

The outer cladding layer of the optical fiber has a refractive index of $n_3$, and is usually fluorine-doped quartz or a plastic coating. $(n_2^2 - n_3^2)^{1/2}$ is in a range from 0.2 to 0.5.

An outermost layer of the optical fiber is a protection layer with a refractive index which is usually about 1.5.

Pump light is mainly transmitted in the inner cladding layer. The D-type inner cladding layer in the prior art means that the inner cladding layer of the double-clad optical fiber has one and only one flat surface, and the rest surfaces are circular. As shown in FIG. 2, in an embodiment of the present disclosure, a cross section of the inner cladding layer is a non-circular plane comprising four identical arcuate notches (for simplicity, the optical fiber is referred to as a 4D double-clad optical fiber in the embodiments of the present disclosure), and the four identical arcuate notches are symmetrically distributed on the non-circular plane. It should be noted that all 4D double-clad optical fibers including different core doping ions as well as analogic 3D, 5D, 6D, 7D double-clad optical fibers etc., are all included in the protection scope of the present disclosure.

A ratio between a height of the arcuate notches on the cross section of the inner cladding layer and a circle diameter of the inner cladding layer is in a range from 0.01 to 0.05. The height of the arcuate notches herein is a chord height of an arch (a vertical line is drawn from a center of a circle to a chord, and a height of an arch refers to a length of a segment on the vertical line that is segmented by the chord and the arch).

Further, in order to prepare the above rare earth-doped double-clad optical fiber, improvement can be made to the existing preparation process. Specifically, following steps are included: a circular quartz preform doped with rare earth elements is prepared by vapor deposition or a solution method or a sol-gel method; a diameter of the circular quartz preform is adjusted to meet a predetermined ratio between a diameter of a fiber core and a diameter of an inner cladding layer; optical processing and polishing is performed on at least two random perpendicular planes of the circular quartz preform to obtain a non-circular quartz preform having a cross section with at least two arcuate notches; and the quartz preform is drawn and a coating is coated outside the glass to form an outer cladding layer, thereby obtaining the rare earth-doped double-clad optical fiber.

A specific process for preparing a 4D double-clad rare earth-doped optical fiber is as follows: a circular quartz preform doped with rare earth elements including Tm, Yb, Ho, Er or being double-doped with for example Yb/Er is prepared by a vapor deposition method and a solution immersion method; a diameter of the preform is adjusted by stretching a sleeving horizontally or vertically and by a corrosion process, so that the preform meets a predetermined ratio between a diameter of a fiber core and a diameter of an inner cladding layer; optical processing and polishing is performed on two arbitrary perpendicular surfaces of the circular preform to obtain four identical planes, and spacing between two planes parallel to each other is precisely controlled; and the preform is drawn at a high temperature by a wire drawing tower, and an inner layer coating having a refractive index of $n_3$ is coated outside the glass to form a 4D type double-clad rare earth-doped optical fiber.

Figure 3:
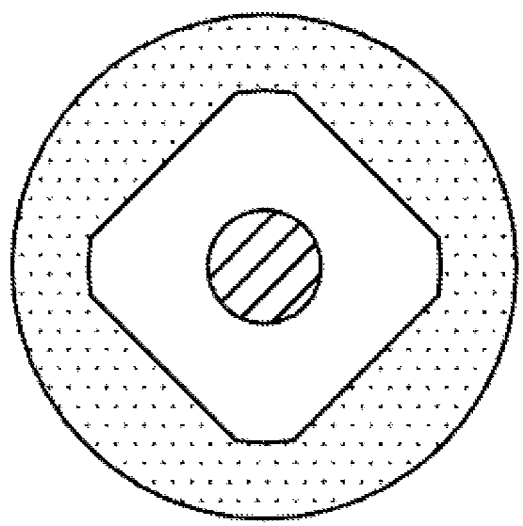
FIG. 3 schematically shows a cross section of a 4D inner cladding layer in an embodiment of the present disclosure (a central circular part is a rare earth-doped fiber core, a2/a3=0.90, and a corresponding ratio between a height of an arcuate notch and a circle diameter of the inner cladding layer is 0.05)
Figure 4:
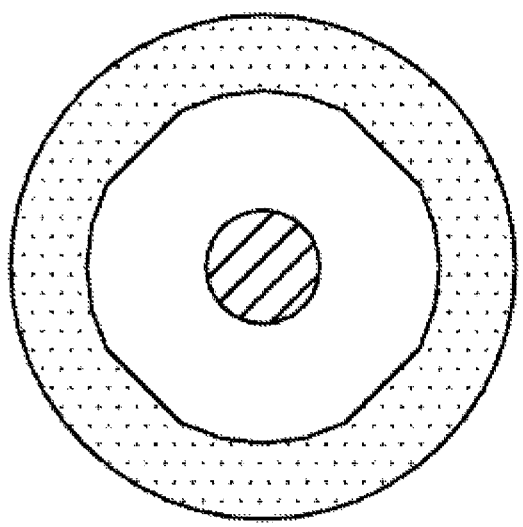
FIG. 4 schematically shows a cross section of a 4D inner cladding layer in an embodiment of the present disclosure (a central circular part is a rare earth-doped fiber core, a2/a3=0.98, and a corresponding ratio between a height of an arcuate notch and a circle diameter of the inner cladding layer is 0.01)
Figure 5:
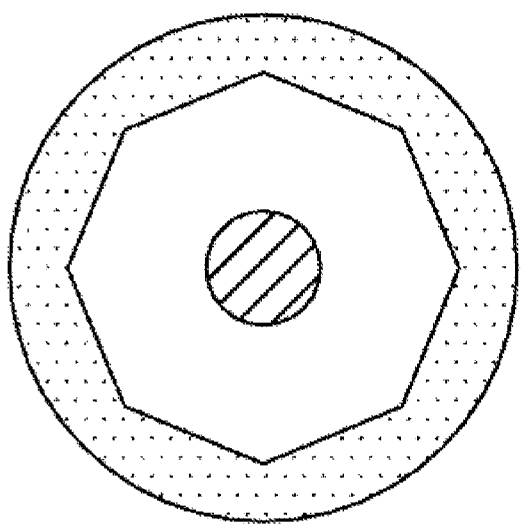
FIG. 5 schematically shows a cross section of an octagonal inner cladding layer in a comparative embodiment (a central circular part is a rare earth-doped fiber core)
Figure 6:
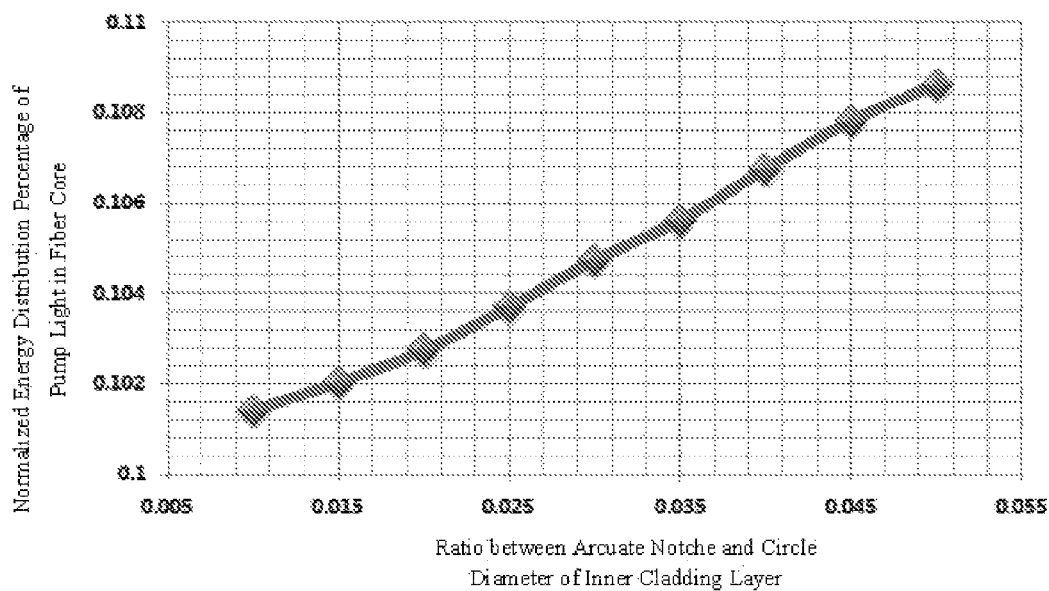
FIG. 6 shows normalized energy distribution percentages of 915 nm pump light in a fiber core of a 4D-type 20/130
Figure 7:
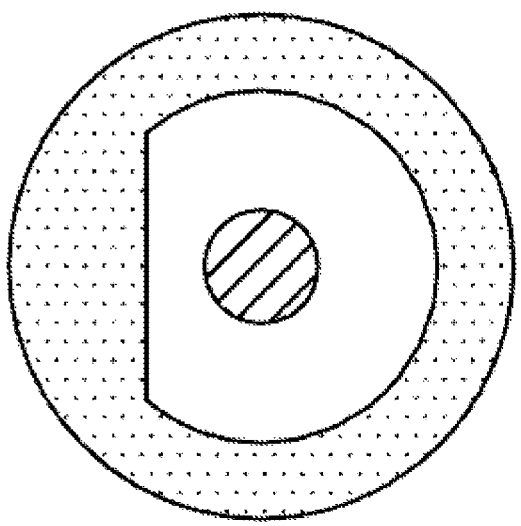
FIG. 7 schematically shows a cross section of an inner cladding layer of a conventional D-type optical fiber.

Taking a 20/130 double-clad optical fiber as an example, FIG. 6 shows test results of a normalized energy distribution of pump light with a wavelength of 915 nm in a 20 um fiber core at different ratios between arcuate notches and a circle diameter of an inner cladding layer. It can be seen from the results that, a ratio between a height of an arcuate notch and a circle diameter of an inner cladding layer corresponding to an octagonal cladding layer of FIG. 5 is 0.025, and a normalized energy distribution portion of the pump light with a wavelength of 915 nm in a 20 um fiber core is 10.374%. The results regarding the octagonal cladding layer are slightly different from those regarding the 4D cladding layer, which indicates that an effect of 4D cladding layer in destroying the helical pump light is equivalent to or even better than that of the octagon cladding layer, and. FIGS. 3, 2, and 4 are diagrams showing that ratios between the height of the arcuate notches and the circle diameter of the inner cladding layer are 0.05, 0.038, and 0.005, respectively.

Those skilled in the art will readily appreciate that the above description is only a preferred embodiment of the present disclosure and is not intended to limit the present disclosure. Any modifications, equivalent substitutions and improvements made within the spirit and the principle of the present disclosure are intended to be included within the protection scope of the present disclosure.

What is claimed is:

1. A rare earth-doped double-clad optical fiber, comprising a rare earth ion-doped fiber core, an inner cladding layer, and an outer cladding layer, wherein a cross section of the inner cladding layer is a non-circular plane comprising at least two arcuate notches, wherein the cross section of the inner cladding layer is a non-circular plane comprising four identical arcuate notches, wherein the at least two arcuate notches are not connected with one another, wherein the four identical arcuate notches are symmetrically distributed on the non-circular plane, and wherein a ratio between a height of the arcuate notches and a circle diameter of the inner cladding layer is in a range from 0.01 to 0.05.

2. The rare earth-doped double-clad optical fiber according to claim 1, wherein a relationship between a refractive index $n_1$ of the fiber core and a refractive index $n_2$ of the inner cladding layer is represented as $(n_1^2-n_2^2)^{1/2}$, which is in a range from 0.01 to 0.25.

3. The rare earth-doped double-clad optical fiber according to claim 1, wherein a relationship between the refractive index $n_2$ of the inner cladding layer and a refractive index $n_3$ of the outer cladding layer is represented as $(n_2^2-n_3^2)^{1/2}$ which is in a range from 0.2 to 0.5.

4. The rare earth-doped double-clad optical fiber according to claim 1, wherein rare earth ions doped in the fiber core comprise one or two of Tm, Yb, Ho, and Er.

5. The rare earth-doped double-clad optical fiber according to claim 1, wherein the inner cladding layer is a silica matrix with a refractive index of 1.4573 and a measurement wavelength of 632 nm.

6. A preparation method of the rare earth-doped double-clad optical fiber according to claim 1, the method comprising:
   preparing a circular quartz preform doped with a rare earth element by vapor deposition;
   adjusting a diameter of the circular quartz preform to meet a predetermined ratio between a diameter of a fiber core and a diameter of an inner cladding layer;
   performing optical processing and polishing on a side surface of the circular quartz preform to obtain a non-circular quartz preform having a cross section with at least two arcuate notches; and
   drawing the quartz preform and coating a coating outside the glass to form an outer cladding layer, thereby obtaining the rare earth-doped double-clad optical fiber.

7. The rare earth-doped double-clad optical fiber according to claim 6, wherein the cross section of the quartz preform is a non-circular plane comprising two or more identical and symmetrically distributed arcuate notches, and a ratio between a height of the arcuate notches and a circle diameter of the inner cladding layer is in a range from 0.01 to 0.05.

* * * * *